(12) United States Patent
Christensen et al.

(10) Patent No.: US 6,428,933 B1
(45) Date of Patent: *Aug. 6, 2002

(54) LITHIUM ION BATTERIES WITH IMPROVED RESISTANCE TO SUSTAINED SELF-HEATING

(75) Inventors: Leif Christensen, St. Paul; Robert L. Turner, Woodbury, both of MN (US)

(73) Assignee: 3M Innovative Properties Company, St. Paul, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 9 days.

This patent is subject to a terminal disclaimer.

(21) Appl. No.: 09/283,647

(22) Filed: Apr. 1, 1999

(51) Int. Cl.[7] .............................................. H01M 4/58
(52) U.S. Cl. ............................. 429/231.95; 429/231.4
(58) Field of Search ......................... 429/231.95, 231.4

(56) References Cited

U.S. PATENT DOCUMENTS 4,011,372 A    3/1977   Tomczuk et al. ........... 429/218
4,048,395 A    9/1977   Lai ............................. 429/112

(List continued on next page.)

FOREIGN PATENT DOCUMENTS

| CA | 2134052 | 4/1995 |
| CA | 2134053 | 4/1995 |

(List continued on next page.)

OTHER PUBLICATIONS

Bates et al., "Recharageble Thin–Film Lithium Microbatteries," *Solid State Technology*, Jul. 1993, pp. 59–64.

(List continued on next page.)

*Primary Examiner*—Steven P. Griffin
*Assistant Examiner*—Jonas N. Strickland
(74) *Attorney, Agent, or Firm*—Dorothy P. Whelan; Daniel R. Pastirik; Lucy C. Weiss (57) ABSTRACT

A lithium ion battery that includes: (a) a cathode; (b) an anode in the form of a thin film which, when lithiated, does not exhibit sustained self-heating at temperatures up to about 100° C.; and (c) an electrolyte separating the anode and the cathode. The battery has a capacity of at least 600 milliamp-hours, a specific energy of at least 100 watt-hours/kg, and a volumetric energy of at least 250 watt-hours/liter.

27 Claims, 7 Drawing Sheets

U.S. PATENT DOCUMENTS

| | | | |
|---|---|---|---|
| 4,076,905 A | 2/1978 | Sammells | 429/112 |
| 4,318,969 A | 3/1982 | Peled et al. | 429/105 |
| 4,434,213 A | 2/1984 | Niles et al. | 429/3 |
| 4,436,796 A | 3/1984 | Huggins et al. | 429/112 |
| 4,489,143 A | 12/1984 | Gilbert et al. | 429/103 |
| 4,547,442 A | 10/1985 | Besenhard et al. | 429/209 |
| 4,626,335 A | 12/1986 | Cupp et al. | 204/293 |
| 4,632,889 A | 12/1986 | McManis et al. | 429/218 |
| 4,652,506 A | 3/1987 | Belanger et al. | 429/192 |
| 4,758,484 A | 7/1988 | Furukawa et al. | 429/194 |
| 4,820,599 A | 4/1989 | Furukawa et al. | 429/194 |
| 4,851,309 A | 7/1989 | Toyoguchi et al. | 429/194 |
| 4,888,258 A | 12/1989 | Desjardins et al. | 429/194 |
| 4,996,129 A | 2/1991 | Tuck | 429/194 |
| 5,278,005 A | 1/1994 | Yamauchi et al. | 429/194 |
| 5,283,136 A | 2/1994 | Peled et al. | 429/192 |
| 5,294,503 A | 3/1994 | Huang et al. | 429/194 |
| 5,350,647 A | 9/1994 | Hope et al. | 429/218 |
| 5,395,711 A | 3/1995 | Tahara et al. | 429/197 |
| 5,437,940 A | 8/1995 | Hilston et al. | 429/103 |
| 5,532,076 A * | 7/1996 | Yamamura et al. | 429/59 |
| 5,532,077 A | 7/1996 | Chu | 429/102 |
| 5,536,600 A | 7/1996 | Kaun | 429/223 |
| 5,541,022 A | 7/1996 | Mizumoto et al. | 429/218 |
| 5,542,163 A * | 8/1996 | Chang | 29/2 |
| 5,597,660 A | 1/1997 | Bates et al. | 429/191 |
| 5,618,640 A | 4/1997 | Idota et al. | 429/194 |
| 5,656,394 A | 8/1997 | Koksban et al. | 429/218 |
| 5,702,845 A * | 12/1997 | Kawakami et al. | 429/224 |
| 5,705,293 A | 1/1998 | Hobson | 429/162 |
| 5,714,277 A | 2/1998 | Kawakami | 429/62 |
| 5,714,280 A | 2/1998 | Nakano et al. | 429/197 |
| 5,747,188 A | 5/1998 | Von Sacken et al. | 429/61 |
| 6,007,947 A * | 6/1998 | Mayer | 429/231.1 |
| 5,780,181 A | 7/1998 | Idota et al. | 429/194 |
| 5,804,335 A | 9/1998 | Kamauchi et al. | 429/218 |
| 5,888,430 A * | 3/1999 | Wakayama et al. | 252/503 |
| 6,203,944 B1 | 3/2001 | Turner et al. | 429/218.1 |
| 6,255,017 B1 | 7/2001 | Turner et al. | 429/218.1 |

FOREIGN PATENT DOCUMENTS

| | | |
|---|---|---|
| CA | 2143388 | 8/1995 |
| DE | 43 20 140 A1 | 2/1994 |
| EP | 0 323 888 | 7/1989 |
| EP | 0 503 969 A1 | 9/1992 |
| EP | 0 631 339 A2 | 12/1994 |
| EP | 0 798 793 A2 | 10/1997 |
| EP | 0 806 804 A1 | 11/1997 |
| EP | 0 813 260 A1 | 12/1997 |
| EP | 0 823 741 A1 | 2/1998 |
| EP | 0 836 238 A1 | 4/1998 |
| EP | 0 845 824 A1 | 6/1998 |
| EP | 0 858 117 A1 | 8/1998 |
| EP | 0 859 418 A1 | 8/1998 |
| EP | 0 862 231 A1 | 9/1998 |
| JP | 61-66369 | 5/1986 |
| JP | 63-13264 | 1/1988 |
| JP | 63-141259 | 6/1988 |
| JP | 6-325764 | 11/1994 |
| JP | 7-288127 | 10/1995 |
| JP | 7-296812 | 10/1995 |
| JP | 7-296812 | 11/1995 |
| JP | 7-312219 | 11/1995 |
| JP | 9-27345 | 1/1997 |
| JP | 10-3920 | 1/1998 |
| JP | 10-223221 | 8/1998 |
| WO | 91/00624 | 1/1991 |
| WO | 96/3351 | 4/1996 |
| WO | WO 97/48145 | 12/1997 |

OTHER PUBLICATIONS

Ferg et al., "Spinel Anodes for Lithium–Ion Batteries," *J. Electrochem. Soc.*, 1994, 141(11):L147–L150.

Jacoby, "Taking Charge of the $21^{st}$ Century," *C&EN*, Aug. 3, 1998, pp. 37–43.

Megahed, "Lithium–ion rechargeable batteries," *J. Power Sources*, 1994, 51:79–104.

Peled et al., "Lithium Alloy–Thionyl Chloride Cells: Performance and Safety Aspects," *Molecular Oxygen Electroreduction*, 1983, 130(6):1365–1368.

Courtney et al., "Electrochemical and In Situ X–Ray Diffraction Studies of the Reaction of Lithium with Tin Oxide Composites", *J. Electrochem. Soc.*, 144(6):2045–2052 (Jun. 1997).

Anani et al., "Investigation of a Ternary Lithium Alloy Mixed–Conducting Matrix Electrode at Ambient Temperature", *J. Electrochem. Soc.: Solid–State Science and Technology*, pp. 2103–2105 (Aug. 1988).

Besenhard et al., "Binary and Ternary Li–Alloys as Anode Materials in Rechargeable Organic Electrolyte Li–Batteries", *Solid State Ionics*, vols. 18 & 19, pp. 823–827 (1986).

Besenhard et al., "Will advanced lithium–alloy anodes have a chance in lithium–ion batteries?", *J. of Power Sources*, 68:87–90 (1997).

Besenhard et al., "Dimensionally Stable Li–Alloy Electrodes for Secondary Batteries", *Solid State Ionics*, 40/41:525–529 (1990).

Besenhard et al., "Will Advanced Li–Alloy Anodes Have A Chance In Lithium–Ion Batteries?", Paper Presented @ the $8^{th}$ International Meeting on Lithium Batteries, Nagoya Japan, 6/96, Extended Abstracts p. 69.

Besenhard et al., "Binary and Ternary Li–Alloys As Anode Materials in Rechargeable Organic Electrolyte Li–Batteries", *Solid State Ionics*, 18/19:823–827 (1986).

Richard et al., "A Cell for In Situ X–Ray Dittraction Based on Coin Cell Hardware and Bellcore Plastic Electrode Technology", *J. Electrochem. Soc.*, 144(2):554–557 (Feb. 1997).

Dahn et al., "Mechanisms for Lithium Insertion in Carbonaceous Materials", *Science*, 270:590–593 (Oct. 27, 1995).

Yang et al., "Small particle size multiphase Li–alloy anodes for Lithium–ion–batteries", *Solid State Ionics*, 90:281–287 (1996).

Courtney et al., "Key Factors Controlling the Reversibility of the Reaction of Lithium with $SnO_2$ and $SN_2BPO_6$ Glass", *J. Electrochem. Soc.*, 144(9):2943–2948 (Sep. 1997).

Wang, et al., "Behavior of Some Binary Lithium Alloys as Negative Electrodes in Organic Solvent–Based Electrolytes", *J. Electrochem. Soc.*, 133(3):457–460 (Mar. 1986).

Idota et al., "Tin–Based Amorphous Oxide: A High–Capacity Lithium–Ion–Storage Material", *Science*, 276:1395–1397 (May 1997).

Fauteux et al., "Rechargeable lithium battery anodes: alternatives to metallic lithium", *J. Applied Electrochemistry*, 23:1–10 (1993).

Dey, "Electrochemical Alloying of Lithium in Organic Electrolytes", *J. Electrochem. Soc.*, 118(10):1547–1549 (1971).

Boukamp et al., "All–Solid Lithium Electrodes with mixed–-Conductor Matrix", *J. Electrochem. Soc.*, 128(4):725–728 (1981).

* cited by examiner

LITHIUM ION BATTERIES WITH IMPROVED RESISTANCE TO SUSTAINED SELF-HEATING

BACKGROUND OF THE INVENTION

This invention relates to lithium ion batteries.

Rechargeable batteries based upon lithium ion cells are attractive because they have inherently high capacities, high energies, and are operable over a useful temperature range. Such batteries feature a cathode, an anode, and a liquid or solid organic electrolyte. One problem with such batteries, however, is a tendency for the battery to self-heat at elevated temperatures. Self-heating results when exothermic reactions within the battery components are activated. Sustained self-heating occurs when the rate of heat generation within the battery exceeds the rate of heat dissipation from the battery surface to the surrounding area. Sustained self-heating can lead to thermal run-away, resulting in venting, flaring, and, in some cases, explosion.

The rate of heat generation increases as the capacity and energy of the battery increase. Accordingly, the problem of sustained self-heating becomes increasingly important as the battery industry seeks to maximize the capacity and energy of lithium ion batteries.

The sustained self-heating problem also limits the ultimate size of the battery. This is because surface area grows as the square of the battery dimensions, whereas volume grows as the cube of the battery dimensions. Accordingly, at a certain size, the rate of heat generation within the battery exceeds the rate of heat dissipation from the battery surface, leading to sustained self-heating at elevated temperatures.

SUMMARY OF THE INVENTION

In general, the invention features a lithium ion battery that includes: (a) a cathode; (b) an anode in the form of a thin film; and (c) an electrolyte separating the anode and the cathode. Both solid and liquid electrolytes can be used. The battery has a capacity of at least 600 milliamp-hours, a specific energy of at least 100 watt-hours/kg, and a volumetric energy of at least 250 watt-hours/liter. When lithiated, the anode does not exhibit sustained self-heating at temperatures up to about 100° C., preferably at temperatures up to about 150° C., and more preferably at temperatures up to about 170° C., as determined using Accelerated Rate Calorimetry described infra. Even more preferred are anodes that do not exhibit sustained self-heating at temperatures up to about 200° C. Preferably, the anode includes an electrochemically active elemental metal.

A "thin film anode" refers to an anode in the form of a continuous film that is free of binders such as polymeric binders. Accordingly, such anodes are distinguishable from composite anodes prepared by admixing an electrochemically active powder with a conductive diluent such as graphite or carbon black, and a binder.

An "electrochemically active elemental metal" is an elemental metal that reacts with lithium under conditions typically encountered during charging and discharging in a lithium battery. An "electrochemically inactive elemental metal" is an elemental metal that does not react with lithium under those conditions.

"Elemental metal" refers to both metals and to metalloids such as silicon and germanium.

A "liquid electrolyte" includes both liquids and liquid-swollen gels.

Examples of preferred electrochemically active elemental metals include aluminum, silicon, tin, antimony, lead, germanium, magnesium, zinc, cadmium, bismuth, and indium. The anode may further include one or more electrochemically inactive elemental metals. Examples include molybdenum, niobium, tungsten, tantalum, iron, and copper. One useful anode features a combination of tin and molybdenum. Other useful anodes include silicon, alone or in combination with aluminum or tin.

The anode has a specific capacity of at least 100 milliamp-hours/g (preferably at least 300 milliamp-hours/g) and a volumetric capacity of at least 600 milliamp-hours/cm$^3$. Several different anode compositions may be used.

According to one embodiment, the anode consists essentially of a plurality of electrochemically active elemental metals, and has a microstructure that includes these elemental metals in the form of a mixture that is essentially free of domains measuring greater than about 1000 angstroms. A "domain" is a region that consists essentially of a single electrochemically active elemental metal. The domain may be crystalline (i.e., it gives rise to a discernible electron or x-ray diffraction pattern characteristic of a crystalline material) or non-crystalline. The size of the domain refers to the longest dimension of the domain. Examples of such anodes are described in Turner, U.S. Ser. No. 09/113,385 entitled "Electrode Material and Compositions Including Same," filed Jul. 10, 1998 and assigned to the same assignee as the present application, which is hereby incorporated by reference in its entirety.

A second useful anode composition is one in which the anode includes (a) an electrochemically active elemental metal and (b) an electrochemically inactive elemental metal. The microstructure of the anode is characterized by the presence of crystalline regions after a battery incorporating the anode has been cycled through one full charge-discharge cycle.

These crystalline regions, which are characterized by a discernible x-ray diffraction pattern characteristic of a crystalline material, preferably have at least one dimension that is no greater than about 500 angstroms after the battery has been cycled through one full charge-discharge cycle, and do not substantially increase after a total of at least 10 cycles. Moreover, these crystalline regions are preferably separated by regions that include the electrochemically active elemental metal and the electrochemically inactive elemental metal in which the relative proportions of the electrochemically active elemental metal and the electrochemically inactive elemental metal vary throughout the thickness direction of the composition (i.e., the direction perpendicular to the substrate on which the thin film is deposited). These latter regions do not exhibit an electron diffraction pattern characteristic of a crystalline material. They may be present prior to cycling, after cycling, or both before and after cycling. Examples of such anodes are described in Turner et al., U.S. Ser. No. 09/048,407 entitled "Electrode Compositions," filed Mar. 26, 1998 and assigned to the same assignee as the present application, which is hereby incorporated by reference in its entirety.

The battery also preferably exhibits good high temperature properties. Specifically, after being subjected to one full charge-discharge cycle at 80° C., the capacity fade is no greater than 2% per cycle, preferably no greater than 1% per cycle, and, even more preferably, no more than 0.5% per cycle.

The invention provides lithium ion batteries that exhibit high capacity and energy, yet exhibit improved resistance to sustained self-heating relative to batteries featuring graphite- or carbon-containing composite electrodes. Conventional battery designs can be used, thereby eliminating the need for elaborate mechanical measures. Moreover, even batteries having relatively large dimensions can be manufactured. The batteries also retain their superior performance (as measured by the extent of capacity fade) at high temperatures.

These batteries could be used as a power supply for a number of devices that operate using energy from a power supply. Examples includes vehicles such a automobiles, trucks, and bicycles. The batteries also could find numerous applications in aircraft. For example, they could be used as an engine starter for the aircraft. They could also be used to supply power to on-board computers and telephones. Other potential applications include power supplies for satellites, telecommunications devices such as cellular telephones, and portable computers.

Other features and advantages of the invention will be apparent from the following description of the preferred embodiments thereof, and from the claims.

DETAILED DESCRIPTION

The invention features high capacity, high energy lithium ion batteries that include a cathode, a thin film anode, and an electrolyte separating the cathode and anode in which the anode resists sustained self-heating at temperatures up to about 100° C., preferably up to about 150° C., more preferably up to about 170° C., and even more preferably up to about 200° C., determined using Accelerated Rate Calorimetry described below.

Examples of useful thin film anodes are described in the Summary of the Invention, above. These films exhibit specific and/or volumetric capacities in excess of the values associated with typical composite graphite anodes, and preferably include at least one electrochemically active elemental metal. They may be prepared according to a variety of methods, including sputtering, chemical vapor deposition, vacuum evaporation, melt spinning, splat cooling, rolling, electrodeposition, and spray atomization.

The electrolyte is provided with a lithium electrolyte salt. Examples of suitable salts include $LiPF_6$, $LiBF_4$, $LiClO_4$, $LiN(SO_2CF_3)_2$, and $LiN(SO_2CF_2CF_3)_2$. Examples of suitable liquid electrolytes include ethylene carbonate, dimethyl carbonate, diethyl carbonate, propylene carbonate, gamma-butyrolactone, tetrahydrofuran, 1,2-dimethoxyethane, dioxolane, and combinations thereof. These materials may also be used in combination with a polymer such as polyethylene oxide, polypropylene oxide, polyacrylonitrile, or polyvinylidene fluoride to produce a swollen gel. Alternatively, a dry, solid polymer may be used as the electrolyte.

Examples of suitable cathode compositions include LiCoO2, $LiCO_{0.2}Ni_{0.8}O_2$, $Li1.07Mn_{1.93}O_4$, $LiNiO_2$, and $LiFePO_4$.

The invention will now be described further by way of the following examples.

EXAMPLES

Thin Film Anode Preparation

Anodes in the form of thin films were prepared by sequential sputtering using either a modified Perkin-Elmer Randex Model 2400-8SA Sputtering System (Examples 2 and 4) or a Mill Lane High Vacuum System (P4) with an 18 inch wide web handling system (Examples 1, 3, and 5).

In the case of the Randex system, the original 8 inch diameter rf sputter sources were replaced with 6 inch diameter dc magnetron sputtering sources commercially available from Materials Science of San Diego, Calif. The sputtering sources were powered using Advanced Energy Model MDX-10 dc sputtering power supplies operating in constant current mode. The turntable drive unit was replaced with a stepper motor to improve rotation speed and control. The system was pumped with an untrapped oil diffusion pump backed by a conventional rotary vane pump.

Sputtering was performed at argon pressures in the range of 3–30 mTorr.

A copper foil (thickness=0.001 inch) was bonded to the water-cooled substrate turntable of the Randex System using double sided adhesive tape (3M Brand Y9415 from 3M Co. of St. Paul, Minn.). The system was closed and pumped down, typically to base pressures below $1 \times 10^{-5}$ Torr (the base pressure prior to deposition is not critical). Prior to deposition, the samples were etched to clean the substrate surface using the "Sputter Etch" mode of the Randex System with 13.56 MHz power applied to the substrate turntable and an argon pressure of 8 mTorr in the sputtering chamber. A typical cleaning cycle was 150W for 30 minutes, with the substrate table rotating during the cycle.

Following etching, the sputtering sources were started up using a mechanical shutter between the sources and the copper substrate. This removed contaminants from the source surface without depositing them on the substrate surface. Next, a "pre-layer" made of a single material of known identity was deposited onto the substrate. The purpose of the pre-layer was to insure good adhesion between the substrate and the sputter deposited film. Next, both sources were started up at pre-determined current levels and deposition initiated. After a suitable deposition time, one or both sources were turned off. A "post-layer" of a single material of known identity was then deposited, after which the system was vented and the sample removed.

In the case of the Mill Lane system, the copper foil was exposed off-line at a rate of 2 ft./min. to an oxygen-doped rf argon plasma in a commercial PlasmaTherm system operated at 1 kW and 200 mTorr. After etching, a segment of the film was positioned using double-sided adhesive tape (as described above) on a rotating drum within the Mill Lane system such that it faced three opposing sputtering targets. The drum was set to rotate at 38 rpm. Deposition commenced at a pressure of 12 mTorr.

First, a pre-layer of tantalum (about 500 angstroms thick) was deposited to improve adhesion between the film and the substrate. This was followed by deposition of the film components using one or two targets operating at a power level between 0.2 kW to 5 kW for a suitable period of time. Finally, a post-layer of a single material of known identity was deposited.

Five films (corresponding to Examples 1–5) were prepared following the above-described procedures. Sputtering conditions are summarized in Table I, below. In Table I, "power" refers to the power level, in kilowatts, of the individual sputtering source used in the Mills Lane system. "Current" refers to the current, in amps, of the individual sputtering source used in the Randex system. "Pressure" refers to the argon pressure, in mTorr, in the sputtering chamber. "Run time" refers to the total amount of time required for deposition, exclusive of the pre- and post-layers.

In the case of pre-layer deposition, a power level of 2 kW was used in Examples 1, 3, and 5, while a current level of 1.5 A was used in Example 2. Example 4 did not contain a pre-layer.

TABLE I

| Example | Materials | Power or Current | Rot. RPM | Pressure mTorr | Run Time Min | Pre Layer | Time Min | Post Layer | Time Min | Etch Time |
|---|---|---|---|---|---|---|---|---|---|---|
| 1 | Sn | 1.7 | 38 | 12 | 240 | | | Sn | 5 | 30 |
|   | Mo | 3.4 | | | | Ta | 4 | | | |
| 2 | Al | 1.5 | 38 | 12 | 250 | | | — | — | — |
|   | Si | 1.5 | | | | Si | 2.5 | | | |
| 3 | Sn | 0.6 | 38 | 13 | 290 | | | — | — | — |
|   | Si | 4.9 | | | | Ta | 4 | | | |
| 4 | Si | 2.0 | 38 | 15 | 210 | — | — | — | — | — |
| 5 | Sn | 3.0 | 9.5 | 12 | 105 | Ta | 4 | — | — | — |

Composite Graphite Anode Preparation

Samples of composite graphite anodes for comparative purposes were prepared by slurry coating a graphite-containing composition onto a copper film substrate, followed by oven drying and calendering. Two different compositions were used. The first composition ("Composition A") contained 87 wt. % MCMB 10-28 graphite (from Alumina), 3 wt. % Shawinigan Black (from Chevron), and 10 wt. % binder ("301F" from Elf Atochem). The second composition ("Composition B") contained 91 wt. % SFG-44 graphite (from TIMCAL America, Inc.), 3 wt. % Super P carbon (from MMM Carbon), and 6 wt. % binder ("Kynar 461" from Elf Atochem).

Lithiation Procedure

Anode components were lithiated according to the following procedure.

Strips measuring 123 mm by 26 mm were lithiated in a flat cell by electrochemical reduction to 0.008V vs. Li. The flat cell consisted of two halves sealed together by means of an o-ring gasket to form a flat cavity. Within the cavity was placed, in order, (a) a metallic lithium foil having a thickness of 150 micrometers (from Cyprus Foote Mineral) that served as both a counter and reference electrode, (b) two microporous polyethylene films, each having a thickness of 25 micrometers, that served as separators, (c) 1.5–2 mL of a 1 molal $LiPF_6$ solution in a 1:1 v/v mixture of ethylene carbonate and diethyl carbonate that served as a liquid electrolyte, and (d) the anode component, in the form of either a sputtered thin film or a graphite composite composition, that served as the working electrode. Contact to the working and counter electrodes was provided through the two cell halves.

The cell was assembled in a dry room, after which it was transferred and cycled in an argon-filled dry box using a Maccor Cell Cycler to lithiate the working electrode. After cycling, the cells were regularly left at open circuit voltage for a minimum of 2 hours before the cell was opened in the glove box and the lithiated working electrode removed and left to dry.

Accelerated Rate Calorimetry

Accelerated Rate Calorimetry ("ARC") was used to evaluate the self-heating behavior of the thin film anodes and the graphite composite anodes in their lithiated state. The instrumentation used for the testing was an ARC-2000 accelerated calorimeter from Columbia Scientific Environmental Instrumentation of Austin, Tex. The ARC instrument is an adiabatic calorimeter that correlates the calorimeter temperature with the sample temperature. If the sample self-heats, the calorimeter temperature increases so that there is no heat flow between the sample and the calorimeter. The resulting measurement is in the form of a graph depicting the onset and rate of sustained self-heating as a function of temperature.

To conduct the ARC tests, strips of lithiated samples were cut in an argon-filled glove box and placed in a 304SS tube measuring 38 mm long with an outer diameter of 0.25 inch. In some cases, where adhesion was poor, the lithiated coatings were flaked off the copper backing before being added to the tube.

Prior to filling, one end of the tube was crimped and tungsten inert gas welded to provide an hermetic seal using a Miller model Maxstar 91 welder equipped with a high frequency arc starter model Snap Star II. The sample weight was recorded, after which a measured amount of electrolyte was added to the tube. Next, the other end of the tube was crimped and sealed by tungsten inert gas welding. During the latter operation, the tube was placed between jaws capable of transferring any heat from the welding away from the contents of the tube.

Following sealing, the sample tube was placed in the ARC calorimeter. The calorimeter was operated in the Heat-Wait-Search Mode. It was initially programmed to heat the calorimeter to 40° C. at a rate of 10° C./min. Heating was followed by a 15 minute wait period to establish temperature stability. At the end of the wait period, a 20 minute search period began.

During the search period, any self-heating of the sample was monitored. If the self-heating measured above a threshold level of 0.03° C./min., it was matched by the calorimeter to establish adiabatic conditions. If no self-heating was observed, the calorimeter temperature was increased 10° C. and the process repeated. Testing was terminated whenever the self-heating rate exceeded 15° C./min. or the calorimeter temperature reached 230° C.

Battery Preparation

Batteries were prepared to test the self-heating behavior of various constructions.

Anode samples were slit into strips measuring 58 mm by 680 mm, with a 10 mm uncoated area at one end. A current collecting nickel tab was ultrasonically welded to the uncoated end.

A cathode was prepared by slurry coating a composition containing 91 wt. % $LiCoO_2$ ("CellSeed 10" from Nippon Chemical Co.), 2.5 wt. % KS-6 graphite (from TIMCAL America), 2.5 wt. % Super P carbon (from MMM Carbon), and 4 wt. % binder ("Kynar 461" from Elf Atochem) on both sides of a 20 micrometer thick aluminum foil, followed by drying and calendering to yield a film having a thickness of 90 micrometers. The resulting article was then slit into strips measuring 56 mm wide by 650 mm long, with a 30 mm uncoated area at one end. A current collecting aluminum tab was ultrasonically welded to the uncoated end.

The resulting anode and cathode were wound in a cylindrical jelly roll with a 60 mm wide, 25 micrometer thick microporous polyethylene separator ("SETELA E25" from Mobil Chemical Corp.) placed between the anode and the cathode. The winding was performed on a laboratory winder from Toyo Systems. After winding, the resulting roll was placed in a 18650 battery cell can, and the can was filled with 4–5 grams of a 1 molal solution of $LiPF_6$ in a 1:1 v/v mixture of ethylene carbonate and diethyl carbonate using a vacuum electrolyte filling system (also from Toyo Systems). The can was then closed in standard fashion by crimping using an insulating ring, spacer, rupture disc, and stainless steel header.

Hot Box Testing

Hot Box Testing was used to evaluate the self-heating behavior of batteries incorporating thin film anodes and carbon (or graphite) composite anodes in their lithiated state. The testing was performed on charged 18650 cylindrical wound batteries (prepared as described above) using a Tenney Model T10S Environmental Test Chamber (from Lunaire Limited of Williamsport, Pa.) preheated to the test temperature.

Prior to testing, the batteries were cycled for 6 to 8 cycles at 23° C. using a Maccor cell cycler. The batteries in a charged state were then placed horizontally in the oven of the test chamber in a Teflon holder with spring loaded metallic contacts to the battery top and bottom. The contact area was kept small to minimize heat transfer. An adhesive microprobe type K thermocouple with thin leads (from Omega Co.) was placed around the battery body to monitor the temperature of the battery surface. Another thermocouple was placed less than 2 cm away from the top of the battery to monitor the oven temperature.

The oven and battery temperature were recorded using a Maccor cell cycler. The general battery performance was also monitored visually through a window in the oven door or via a video camera.

Comparative Example A

This comparative example illustrates the self-heating behavior of a composite graphite anode prepared using Composition A. A strip was lithiated to a level of 362 milliamp-hours/g by cycling a total of one and a half cycles (ending with a lithiation step) between 0.008V and 1.2V. The samples were then allowed to equilibrate at open circuit voltage.

Samples for ARC testing were prepared in an argon-filled glove box by adding 172 mg of a lithiated strip (corresponding to 74 mg of active material and a lithiation level of 27 milliamp-hours) to an ARC sample tube. 100 mg of a 1 molal solution of LiPF$_6$ in a 1:1 v/v mixture of ethylene carbonate and diethyl carbonate were then added and the sample tube sealed.

Figure 1:
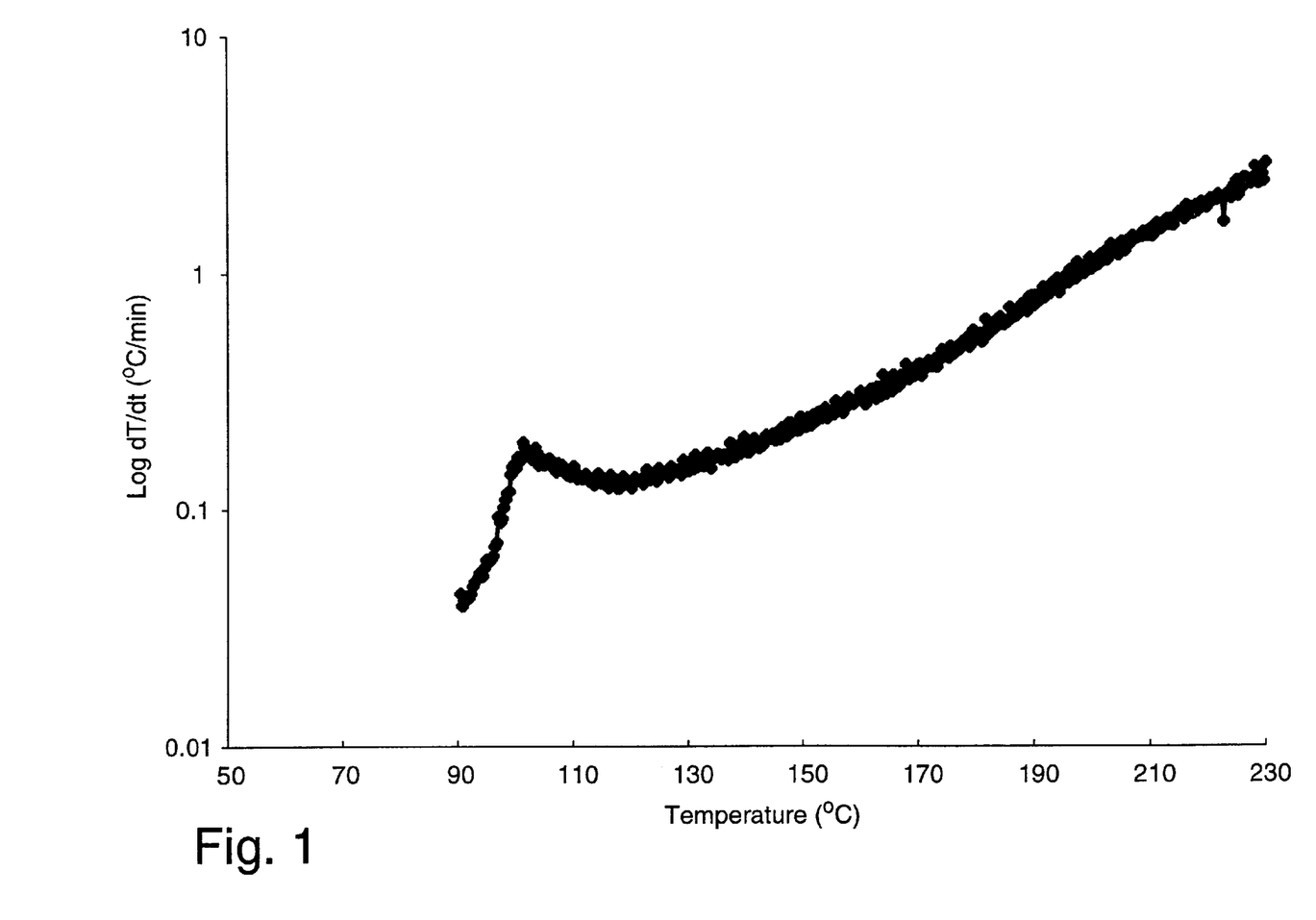
FIG. 1 illustrates the onset temperature for sustained self-heating, and the self-heating rate as a function of temperature, for the composite graphite anode described in Comparative Example A, measured using Accelerated Rate Calorimetry.

The ARC curve recorded from 40° C. to 230° C. from this sample is shown in FIG. 1. As shown in FIG. 1, the onset temperature of sustained self-heating was 90° C.

Comparative Example B

This comparative example illustrates the self-heating behavior of a composite graphite anode prepared using Composition B. A strip was lithiated to a level of 430 milliamp-hours/g by cycling a total of one and a half cycles (ending with a lithiation step) between 0.008V and 1.2V. The samples were then allowed to equilibrate at open circuit voltage.

Samples for ARC testing were then prepared in an argon-filled glove box by flaking the coating off the copper foil backing and adding 106 mg of the flakes (corresponding to 63 mg of active material and a lithiation level of 27 milliamp-hours) to an ARC sample tube. 100 mg of a 1 molal solution of LiPF$_6$ in a 1:1 v/v mixture of ethylene carbonate and diethyl carbonate were then added and the sample tube sealed.

Figure 2:
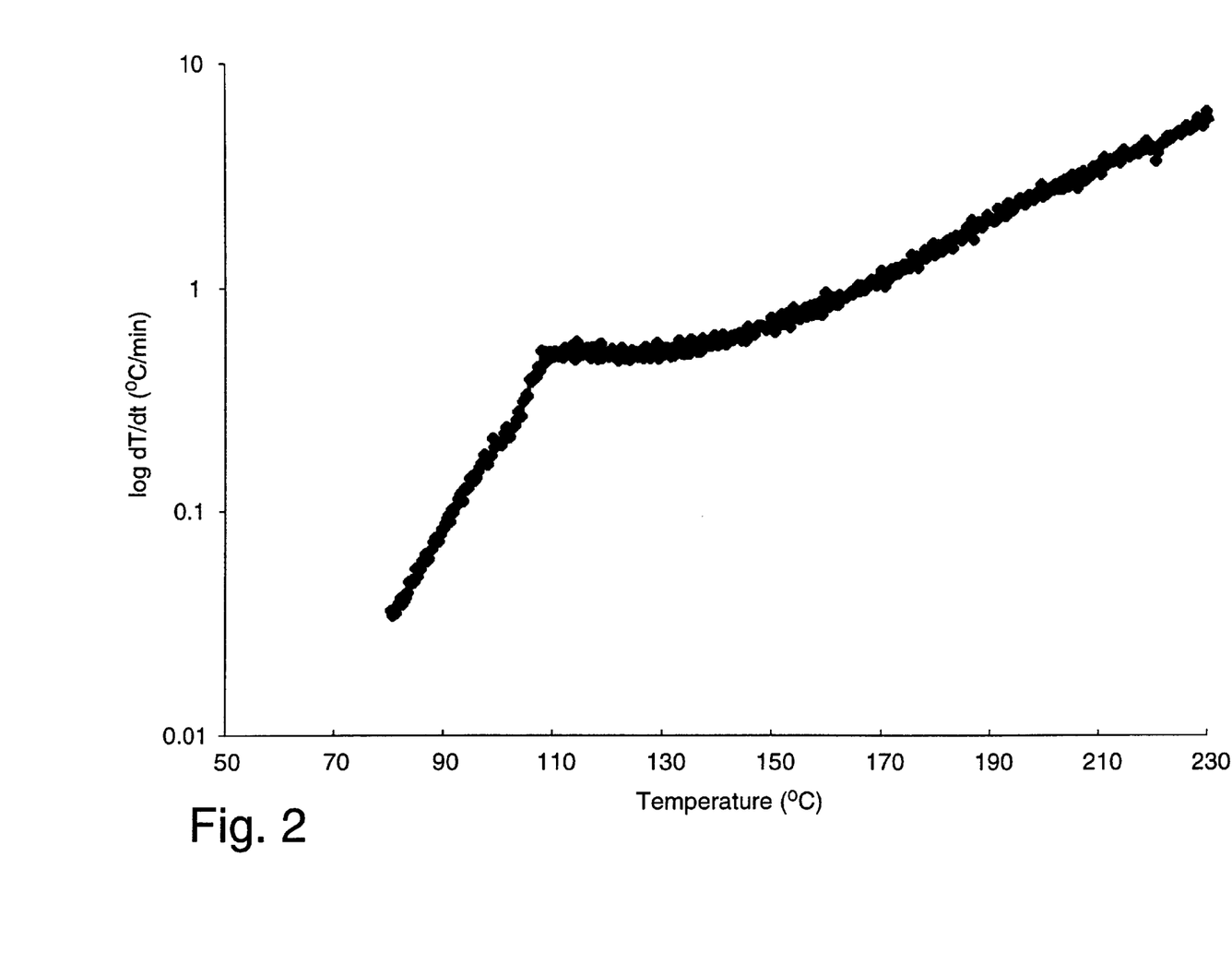
FIG. 2 illustrates the onset temperature for sustained self-heating, and the self-heating rate as a function of temperature, for the composite graphite anode described in Comparative Example B, measured using Accelerated Rate Calorimetry.

The ARC curve recorded from 40° C. to 230° C. from this sample is shown in FIG. 2. As shown in FIG. 2, the onset temperature of sustained self-heating was 80° C.

Example 1

This example illustrates the self-heating behavior of a thin film anode containing 54 wt. % tin and 46 wt. % molybdenum on a 25 micrometer thick copper foil. A strip was lithiated to a level of 353 milliamp-hours/g by cycling a total of one and a half cycles (ending with a lithiation step) between 0.008V and 1.2V, followed by equilibration at open cell voltage for at least 2 hours. Samples for ARC testing were then prepared in an argon-filled glove box by adding 265 mg of the sample (corresponding to 73 mg of active material and a lithiation level of 26 milliamp-hours) to an ARC sample tube. 100 mg of a 1 molal solution of LiPF$_6$ in 1:1 v/v ethylene carbonate and diethyl carbonate were then added and the sample tube sealed.

Figure 3:
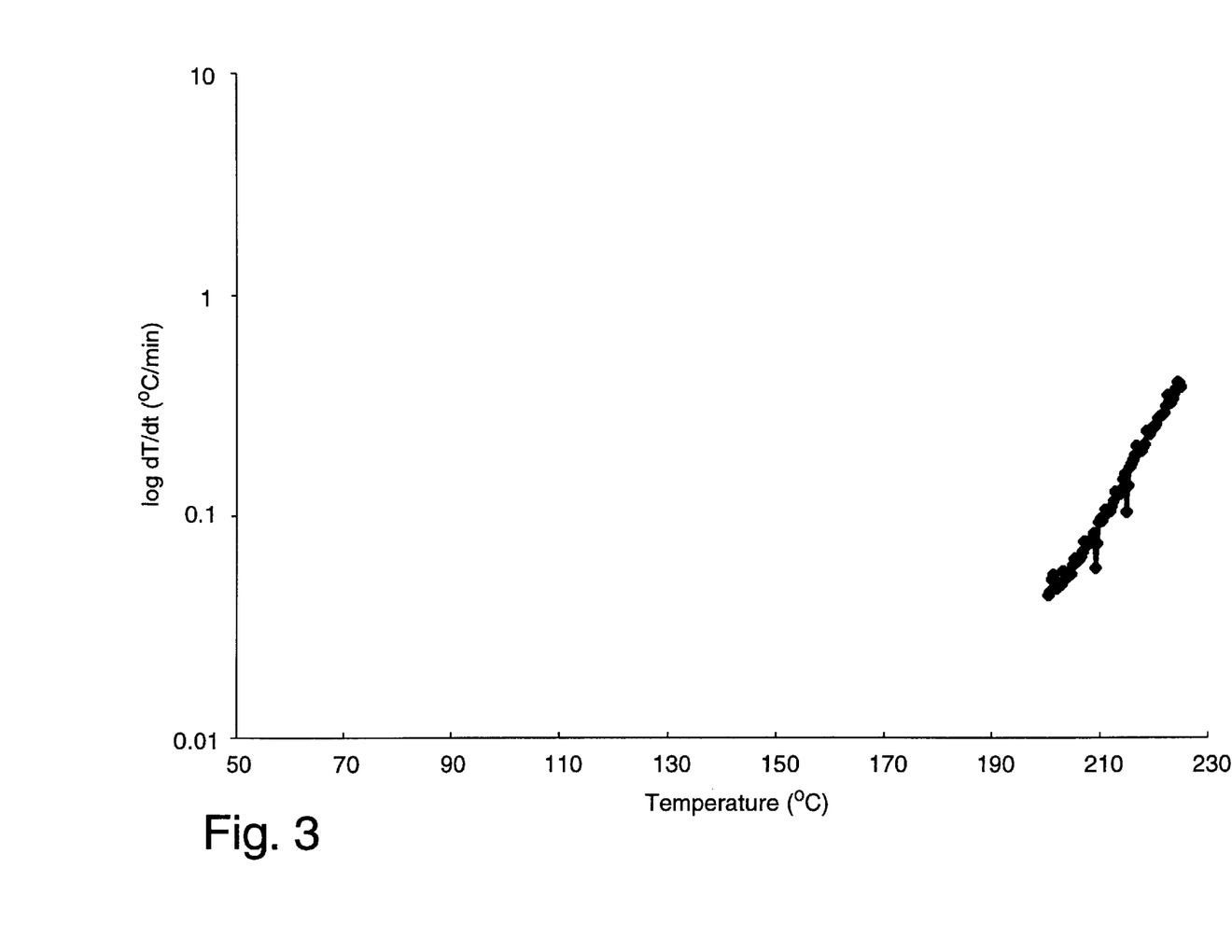
FIG. 3 illustrates the onset temperature for sustained self-heating, and the self-heating rate as a function of temperature, for the tin/molybdenum thin film anode described in Example 1, measured using Accelerated Rate Calorimetry.

The ARC curve recorded from 40° C. to 230° C. from this sample is shown in FIG. 3. As shown in FIG. 3, the onset temperature of sustained self-heating was 200° C.

Example 2

This example illustrates the self-heating behavior of a thin film anode containing 64 wt. % aluminum and 36 wt. % silicon on a 25 micrometer thick copper foil. A strip was lithiated to a level of 1443 milliamp-hours/g by cycling a total of one and a half cycles (ending with a lithiation step) between 0.008V and 0.9V, followed by equilibration at open cell voltage for at least 2 hours. Samples for ARC testing were then prepared in an argon-filled glove box by adding 84 mg of sample flakes (corresponding to 19 mg of active material and a lithiation level of 27 milliamp-hours) to an ARC sample tube. 100 mg of a 1 molal solution of LiPF$_6$ in 1:1 v/v ethylene carbonate and diethyl carbonate were then added and the sample tube sealed.

The ARC curve for this sample, recorded from 40° C. to 230° C., showed the onset temperature of sustained self-heating to be 190° C.

Example 3

This example illustrates the self-heating behavior of a thin film anode containing 74 wt. % tin and 26 wt. % silicon on a 25 micrometer thick copper foil. A strip was lithiated to a level of 1864 milliamp-hours/g by cycling a total of one and a half cycles (ending with a lithiation step) between 0.008V and 0.9V, followed by equilibration at open cell voltage for at least 2 hours. Samples for ARC testing were then prepared in an argon-filled glove box by adding 51 mg of the sample (corresponding to 14.5 mg of active material and a lithiation level of 27 milliamp-hours) to an ARC sample tube. 100 mg of a 1 molal solution of LiPF$_6$ in 1:1 v/v ethylene carbonate and diethyl carbonate were then added and the sample tube sealed.

The ARC curve for this sample, recorded from 40° C. to 230° C., showed the onset temperature of sustained self-heating to be 180° C.

Example 4

This example illustrates the self-heating behavior of a thin film anode containing 100 wt. % amorphous silicon on a 25 micrometer thick copper foil. A strip was lithiated to a level of 3360 milliamp-hours/g by cycling a total of one and a half cycles between 0.008V and 0.9V, followed by equilibration at open cell voltage for at least 2 hours. Samples for ARC testing were then prepared in an argon-filled glove box by adding 65 mg of sample flakes (corresponding to 8.0 mg of active material and a lithiation level of 27 milliamp-hours) to an ARC sample tube. 100 mg of a 1 molal solution of LiPF$_6$ in 1:1 v/v ethylene carbonate and diethyl carbonate were then added and the sample tube sealed.

The ARC curve for this sample, recorded from 40° C. to 230° C., showed the onset temperature of sustained self-heating to be 190° C.

Example 5

This example illustrates the self-heating behavior of a thin film anode containing 100 wt. % tin on a 25 micrometer thick copper foil. A strip was lithiated to a level of 725 milliamp-hours/g by cycling a total of one and a half cycles (ending with a lithiation step) between 0.008V and 0.9V, followed by equilibration at open cell voltage for at least 2 hours. Samples for ARC testing were then prepared in an argon-filled glove box by adding 134 mg of the sample (corresponding to 26.9 mg of active material and a lithiation level of 27 milliamp-hours) to an ARC sample tube. 100 mg of a 1 molal solution of LiPF$_6$ in 1:1 v/v ethylene carbonate and diethyl carbonate were then added and the sample tube sealed.

The ARC curve for this sample, recorded from 40° C. to 230° C., showed the onset temperature of sustained self-heating to be 200° C.

Comparative Example C

A commercial 18650 lithium ion battery was obtained from a Sony NPF950 camcorder battery pack. The battery had a volume of 16.54 cm$^3$ and a mass of 40.5 g. The battery, as received from the factory, was cycled for eight cycles to establish performance according to a standard cycling protocol for this type of battery. The battery was charged to 4.2V using a constant current of 0.28 amps with trickle charge to a current limit of 0.03 amps, followed by discharging to 2.75V using a constant current of 0.28 amps. Based upon the cycling results, the battery's capacity was determined to be 1372 milliamp-hours and 5074 milliwatt-hours, corresponding to a battery energy density of 125 watt-hours/kg and 306 watt-hours/liter.

Figure 4:
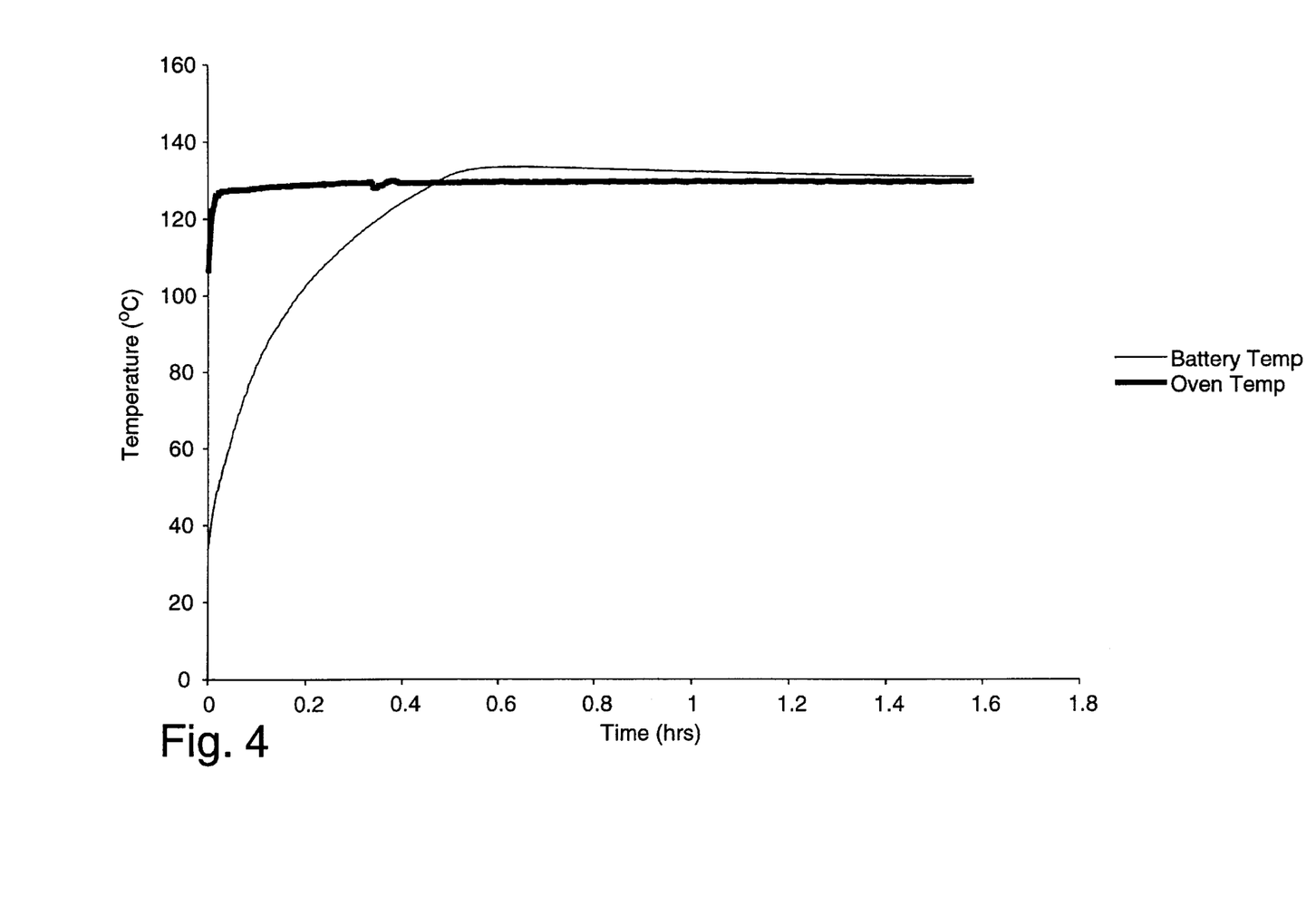
FIG. 4 illustrates the oven temperature and outside battery temperature reached during Hot Box testing of the battery described in Comparative Example C incorporating a composite carbon anode.

While in the charged state, the battery was subjected to Hot Box testing at 130° C. The recorded battery temperature is shown in FIG. 4. As shown in FIG. 4, a maximum surface temperature of 133.6° C. was reached due to self-heating from the battery components.

Example 6

This example demonstrates the preparation of a battery having a higher capacity than the battery described in Comparative Example C, yet which does not exhibit sustained self-heating or thermal run-away at temperatures up to at least about 130° C.

An 18650 battery was prepared as described above using a thin film anode containing 54 wt. % tin and 46 wt. % molybdenum, and a LiCoO$_2$ composite cathode. The active anode weight was 6.35 g, the active cathode weight was 15.71 g, and the active battery area was 694 cm$^2$. The total battery weight was 50.78 g and the total battery volume was 16.54 cm$^2$.

After a single formation cycle, the battery was cycled for four cycles between 4.2V and 2.0V by charging the battery to 4.2V using a constant current of 0.3 amps with trickle charge to a current limit of 0.03 amps, followed by discharging to 2V at a constant current of 0.3 amps with a trickle charge to 0.03 amps. At cycle number six, the charge capacity was limited to 1700 milliamp-hours, corresponding to 5746 milliwatt-hours/liter. This corresponds to a battery energy density of 113 watt-hours/kg and 347 watt-hours/liter.

Figure 6:
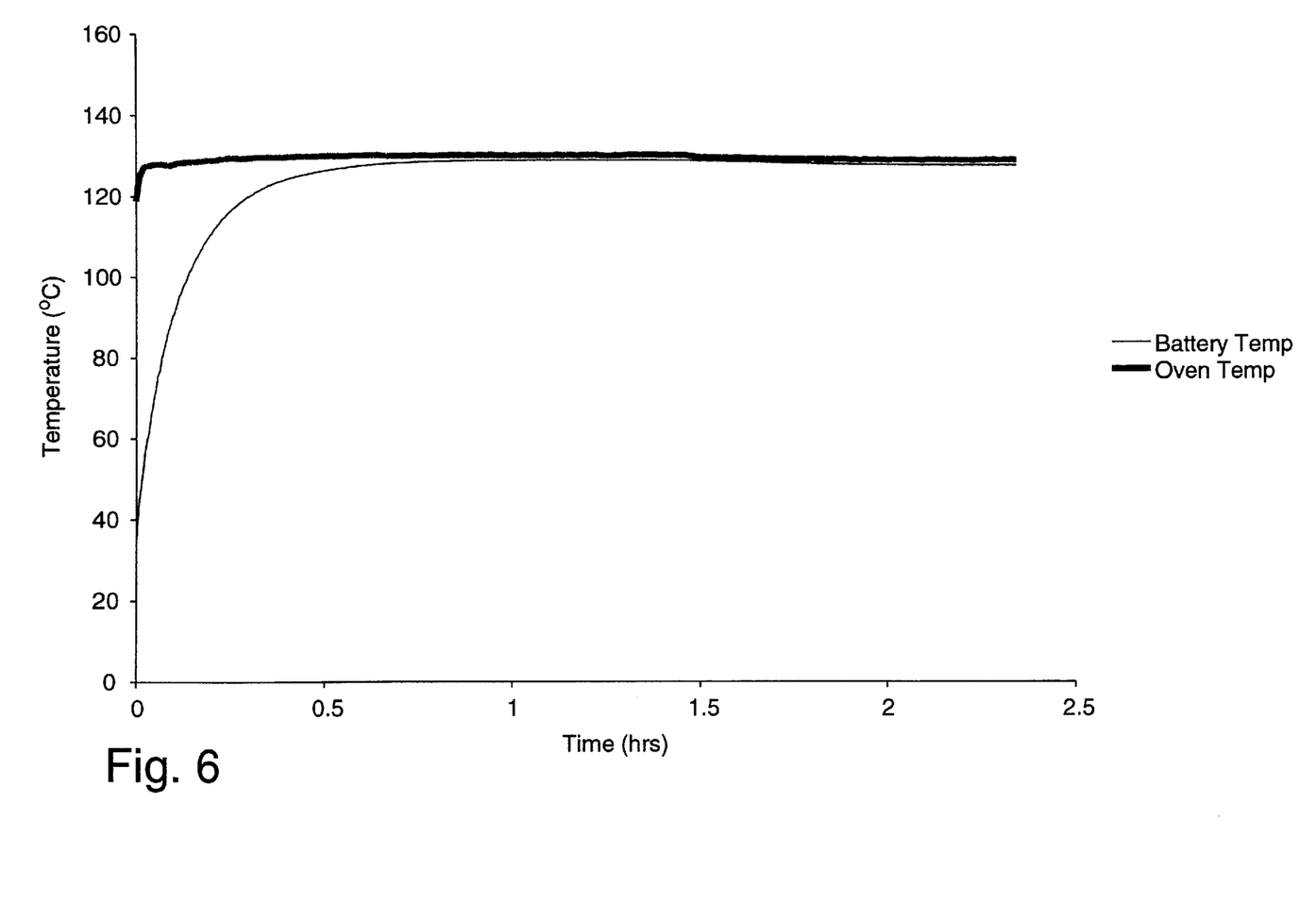
FIG. 6 illustrates the oven temperature and outside battery temperature reached during Hot Box testing of the battery described in Example 6 incorporating a tin/molybdenum thin film anode.

While in the charged state, the battery was subjected to Hot Box testing at 130° C. The recorded battery temperature is shown in FIG. 6. As shown in FIG. 6, a maximum surface temperature of about 130° C. was reached. No self-heating or thermal run-away was observed.

COMPARATIVE EXAMPLE D

Figure 5:
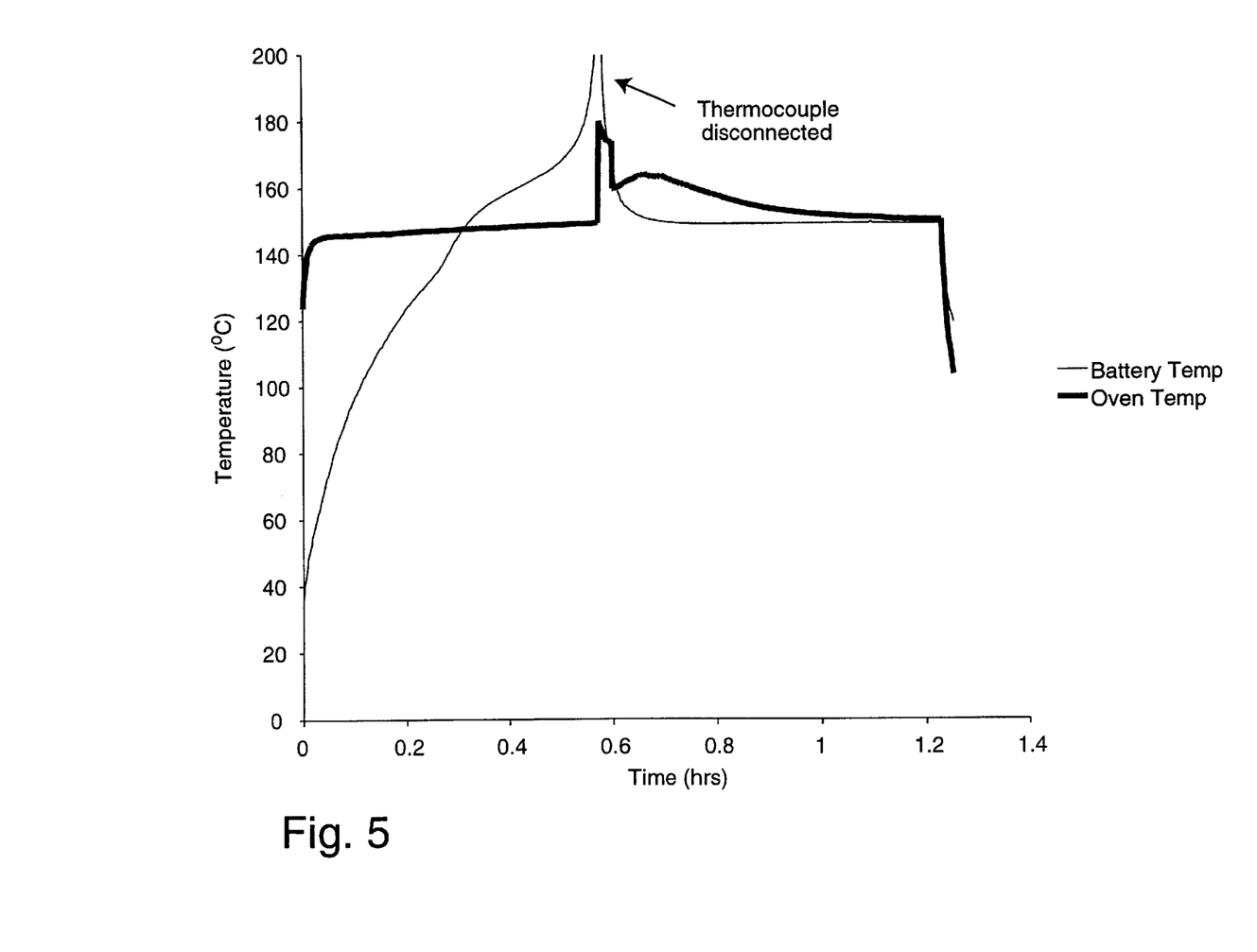
FIG. 5 illustrates the oven temperature and outside battery temperature reached during Hot Box testing of the battery described in Comparative Example D incorporating a composite carbon anode.

The procedure of Comparative Example C was repeated except that the battery was subjected to Hot Box testing at 150° C. The recorded battery temperature is shown in FIG. 5. After approximately 30 minutes, the battery exhibited thermal run-away, resulting in venting and flaring.

EXAMPLE 7

This example demonstrates the preparation of a battery having a higher capacity than the battery described in Comparative Example D, yet which does not exhibit thermal run-away at temperatures up to at least 152.7° C.

The procedure of Example 6 was followed except that the active anode weight was 6.18 g and the active cathode weight was 15.78 g. The total battery weight was 50.69 g.

After a single formation cycle, the battery was cycled for four cycles between 4.2V and 2.0V by charging the battery to 4.2V using a constant current of 0.3 amps with trickle charge to a current limit of 0.03 amps, followed by discharging to 2V at a constant current of 0.3 amps with a trickle charge to 0.03 amps. At cycle number six, the charge capacity was limited to 1740 milliamp-hours, corresponding to 5846 milliwatt-hours/liter. This corresponds to a battery energy density of 115 watt-hours/kg and 353 watt-hours/liter.

Figure 7:
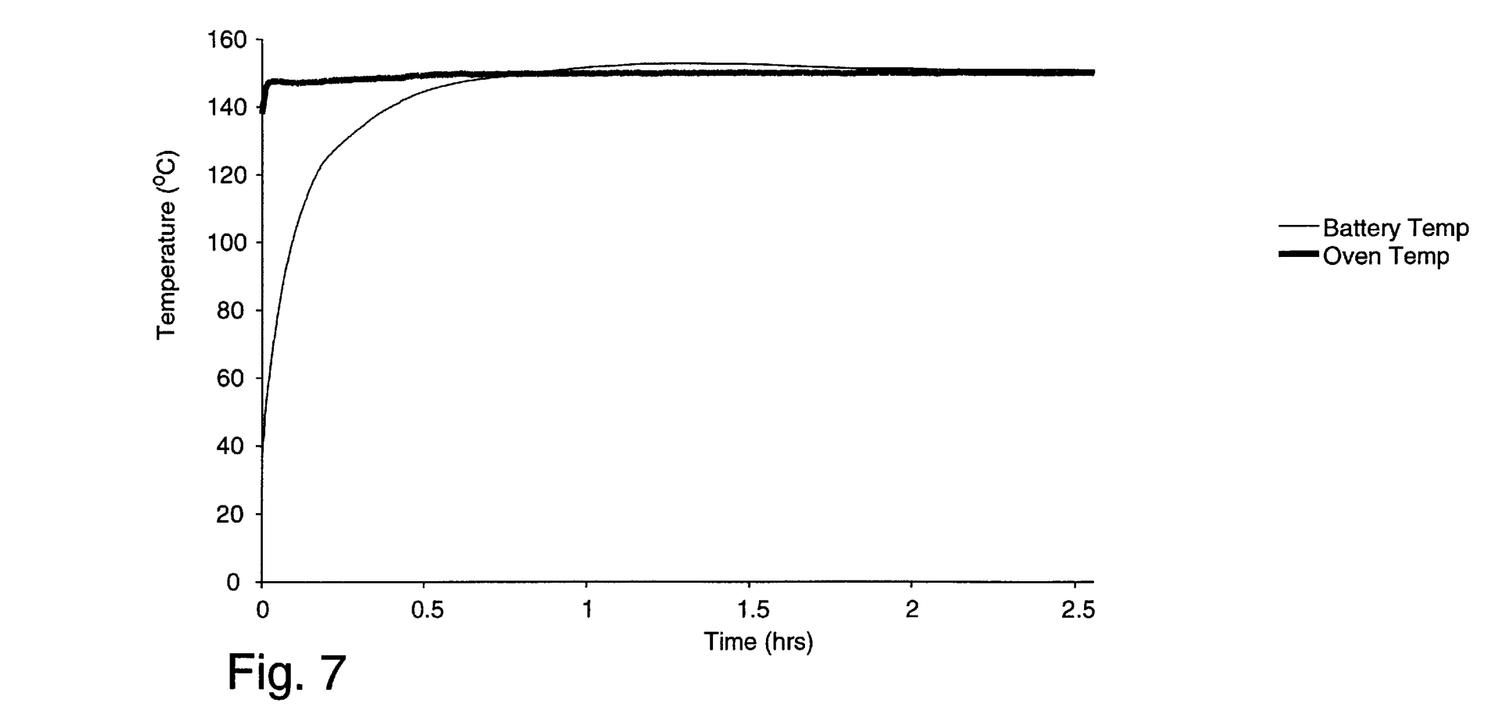
FIG. 7 illustrates the oven temperature and outside battery temperature reached during Hot Box testing of the battery described in Example 7 incorporating a tin/molybdenum thin film anode.

While in the charged state, the battery was subjected to Hot Box testing at 150° C. The recorded battery temperature is shown in FIG. 7. As shown in FIG. 7, a maximum surface temperature of 152.7° C. was reached. No thermal run-away was observed.

Other embodiments are within the following claims.

What is claimed is:

1. A lithium ion battery comprising:
   (a) a cathode;
   (b) an anode in the form of a thin film which, when lithiated, does not exhibit sustained self-heating at temperatures up to about 100° C.; and
   (c) an electrolyte separating said anode and said cathode, wherein said battery has a capacity of at least 600 milliamp-hours, a specific energy of at least 100 watt-hours/kg, and a volumetric energy of at least 250 watt-hours/liter.

2. A lithium ion battery according to claim 1 wherein said anode does not exhibit sustained self-heating at temperatures up to about 150° C.

3. A lithium ion battery according to claim 1 wherein said anode does not exhibit sustained self-heating at temperatures up to about 170° C.

4. A lithium ion battery according to claim 1 wherein said anode does not exhibit sustained self-heating at temperatures up to about 200° C.

5. A lithium ion battery according to claim 1 wherein said anode has a specific capacity of at least 100 milliamp-hours/g and a volumetric capacity of at least 600 milliamp-hours/cm$^3$.

6. A lithium ion battery according to claim 1 wherein said anode has a specific capacity of at least 300 milliamp-hours/g and a volumetric capacity of at least 600 milliamp-hours/cm$^3$.

7. A lithium ion battery according to claim 1 wherein said anode comprises an electrochemically active elemental metal.

8. A lithium ion battery according to claim 7 wherein said electrochemically active elemental metal is selected from the group consisting of aluminum, silicon, tin antimony, lead, germanium, magnesium, zinc, cadmium, bismuth, and indium.

9. A lithium ion battery according to claim 7 wherein said anode further comprises an electrochemically inactive elemental metal.

10. A lithium ion battery according to claim 9 wherein said electrochemically inactive elemental metal is selected from the group consisting of molybdenum, niobium, tungsten, tantalum, iron, and copper.

11. A lithium ion battery according to claim 1 wherein said anode consists essentially of a plurality of electrochemically active elemental metals,
    said anode having a microstructure comprising said elemental metals in the form of a mixture that is essentially free of domains measuring greater than about 1000 angstroms.

12. A lithium ion battery according to claim 1 wherein said anode comprises (a) an electrochemically active elemental metal and (b) an electrochemically inactive elemental metal, said anode comprising crystalline regions after said battery has been cycled through one full charge-discharge cycle.

13. A lithium ion battery according to claim 12 wherein said crystalline regions have at least one dimension that is no greater than about 500 angstroms after said battery has been cycled through one full charge-discharge cycle, and that does not substantially increase after a total of at least 10 cycles.

14. A lithium ion battery according to claim 12 wherein said crystalline regions are separated by regions comprising said electrochemically active elemental metal and said electrochemically inactive elemental metal in which the relative proportions of said electrochemically active elemental metal and said electrochemically inactive elemental metal vary throughout the thickness direction of said composition.

15. A lithium ion battery according to claim 1 wherein said anode comprises elemental tin.

16. A lithium ion battery according to claim 1 wherein said anode comprises elemental tin and elemental molybdenum.

17. A lithium ion battery according to claim 1 wherein said anode comprises elemental silicon.

18. A lithium ion battery according to claim 1 wherein said anode comprises elemental aluminum and elemental silicon.

19. A lithium ion battery according to claim 1 wherein said anode comprises elemental tin and elemental silicon.

20. A lithium ion battery according to claim 1 wherein the capacity of said battery, after one full charge-discharge cycle at 80° C., does not fade more than 2% per cycle.

21. A lithium ion battery according to claim 1 wherein the capacity of said battery, after one full charge-discharge cycle at 80° C., does not fade more than 1% per cycle.

22. A lithium ion battery according to claim 1 wherein the capacity of said battery, after one full charge-discharge cycle at 80° C., does not fade more than 0.5% per cycle.

23. An apparatus that is operated using energy provided by a power supply, wherein said power supply comprises a lithium ion battery comprising:
(a) a cathode;
(b) an anode in the form of a thin film which, when lithiated, does not exhibit sustained self-heating at temperatures up to 100° C.; and
(c) an electrolyte separating said anode and said cathode, wherein said battery has a capacity of at least 600 milliamp-hours, a specific energy of at least 100 watt-hours/kg, and a volumetric energy of at least 250 watt-hours/liter.

24. An apparatus according to claim 23 wherein said apparatus comprises a motor vehicle.

25. An apparatus according to claim 23 wherein said apparatus comprises a computer.

26. An apparatus according to claim 23 wherein said apparatus comprises a power tool.

27. An apparatus according to claim 23 wherein said apparatus comprises a telecommunications device.

* * * * *